United States Patent
Moskun (10) Patent No.: US 7,758,315 B2
(45) Date of Patent: Jul. 20, 2010

(54) PUMP CONTROLLER FOR CONTROLLING PUMPS CONNECTED IN TANDEM

(75) Inventor: Peter Moskun, Quebec (CA)

(73) Assignee: Ansul Canada Limited, Toronto (CA)

( * ) Notice: Subject to any disclaimer, the term of this patent is extended or adjusted under 35 U.S.C. 154(b) by 1121 days.

(21) Appl. No.: 11/398,808

(22) Filed: Apr. 6, 2006

(65) Prior Publication Data

US 2007/0056630 A1 Mar. 15, 2007

Related U.S. Application Data

(60) Provisional application No. 60/717,300, filed on Sep. 15, 2005.

(51) Int. Cl.
F04B 49/06 (2006.01)
A01G 27/00 (2006.01)

(52) U.S. Cl. .......................... 417/44.3; 417/18; 417/34; 417/43; 417/45; 239/68

(58) Field of Classification Search .................. 417/18, 417/34, 43, 44.3, 45; 239/68
See application file for complete search history.

(56) References Cited

U.S. PATENT DOCUMENTS

| | | | |
|---|---|---|---|
| 3,974,879 A | 8/1976 | Nelson, Jr. et al. | |
| 5,221,189 A * | 6/1993 | Henningsen | 417/12 |
| 5,237,310 A | 8/1993 | Smith | |
| 5,529,460 A | 6/1996 | Eihusen et al. | |
| 6,547,528 B1 | 4/2003 | Yoshida | |
| 6,651,900 B1 * | 11/2003 | Yoshida | 239/72 |
| 2004/0054921 A1 * | 3/2004 | Land, III | 713/200 |
| 2004/0267395 A1 * | 12/2004 | Discenzo et al. | 700/99 |

FOREIGN PATENT DOCUMENTS

| CA | 1261034 A1 | 9/1989 |
|---|---|---|
| JP | 56000583 A | 1/1981 |
| JP | 9051960 A | 2/1997 |

\* cited by examiner

*Primary Examiner*—Devon C Kramer
*Assistant Examiner*—Leonard J Weinstein
(74) *Attorney, Agent, or Firm*—Dean Small; The Small Patent Law Group (57) ABSTRACT

A system for automatically controlling a pumping unit used in fire suppression comprises a pumping unit, a water flow sensor and a pump controller. The pumping unit has a pump with a suction inlet configured to receive water from an upstream pumping unit and an engine to run the pump. The water flow sensor senses water flow into the suction inlet of the pumping unit. The pump controller receives a water flow sensor signal from the water flow sensor and controls an on/off state of the engine based on the water flow sensor signal.

20 Claims, 4 Drawing Sheets

FIG. 4

PUMP CONTROLLER FOR CONTROLLING PUMPS CONNECTED IN TANDEM

CROSS REFERENCE TO RELATED APPLICATIONS

The application relates to and claims priority from provisional patent application Ser. No. 60/717,300, titled "PUMP CONTROLLER", filed Sep. 15, 2005, the complete subject matter of which is expressly hereby incorporated herein in its entirety.

BACKGROUND OF THE INVENTION

This invention relates generally to pumps used for fighting fire, and more particularly, to automatically controlling pumps connected in tandem and/or parallel-tandem configurations.

Fire fighting pumps are important in the forestry industry, as well as in other applications. For example, water is not always readily available in the forest where it is needed to fight a fire. At times, water may be pumped thousands of feet through varying terrains and elevations to get to the fire. The water also needs to be delivered with a desired flow rate capacity.

Pressure loss is caused, in part, by increases in elevation, also referred to as "static head". Typically, for every one foot of elevation there is a loss of approximately 0.5 pounds per square inch (psi), and static head is the difference in elevation between the pump discharge outlet and the nozzle at the end of the hose. For example, if the pump being used produces 100 psi and an elevation difference of 100 feet exists between the pump and the nozzle end of the hose, only 50 psi is available at the nozzle. Friction loss is a loss of pressure due to friction between the water and the hose. The friction loss increases as the flow in the hose increases.

A higher pressure pump may be used to overcome some pressure and friction losses. A single pump with very high pressure, however, is often not a viable solution due to the pressure rating limitations of the hose. If the pump produces too much pressure, there is a chance that the hose will burst. Therefore, pumps are often set up in tandem, or in series with one another, with one pump pumping water to the next pump and so on, to create a water supply line. The distance between pumps varies depending on the terrain, elevation and equipment being used. Generally, pumps may be located 500 feet to 1000 feet apart.

It is difficult for a single operator to control each pump in a water supply line due to the terrain and the distance between the pumps. Typically, two operators are needed to start and stop the pumps connected in tandem. If a single operator is available, the operator starts one pump, moves to the next downstream pump to start it, and so on. If one pump stops unexpectedly or the water supply is disconnected, the operator needs to run between pumps to turn them on and off as needed, as it is undesirable for a pump to run dry as it may sustain damage as well as waste fuel and water.

Therefore, a need exists for a system to simultaneously control pumps operating in tandem. Certain embodiments of the present invention are intended to meet these needs and other objectives that will become apparent from the description and drawings set forth below.

BRIEF DESCRIPTION OF THE INVENTION

In one embodiment, a system for automatically controlling a pumping unit used in fire suppression comprises a pumping unit, a water flow sensor and a pump controller. The pumping unit comprises a pump having a suction inlet configured to receive water from an upstream pumping unit and an engine to run the pump. The water flow sensor senses water flow into the suction inlet of the pumping unit. The pump controller receives a water flow sensor signal from the water flow sensor and controls an on/off state of the engine based on the water flow sensor signal.

In another embodiment, a system for controlling a pumping unit used in fire suppression comprises means for supplying water to a suction inlet of a pumping unit. A water flow sensor detects the water in the suction inlet of the pumping unit. A microprocessor controls the operation of the pumping unit based on at least a signal from the water flow sensor indicating whether water is available at the suction inlet. The microprocessor outputs a start signal to start the pumping unit when the water flow sensor indicates water is available and inhibits the pumping unit from running when the water flow sensor indicates water is not available.

In another embodiment, a method for automatically controlling a pumping unit used in fire suppression comprises connecting a discharge outlet of an upstream pumping unit with a suction inlet of a pumping unit. A water flow sensor signal is monitored to determine if water is available at the suction inlet of the pumping unit. A start signal is output to start an engine which runs the pumping unit when the water flow sensor indicates that water is available at the suction inlet.

The foregoing summary, as well as the following detailed description of certain embodiments of the present invention, will be better understood when read in conjunction with the appended drawings. The figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

DETAILED DESCRIPTION OF THE INVENTION

Figure 1:
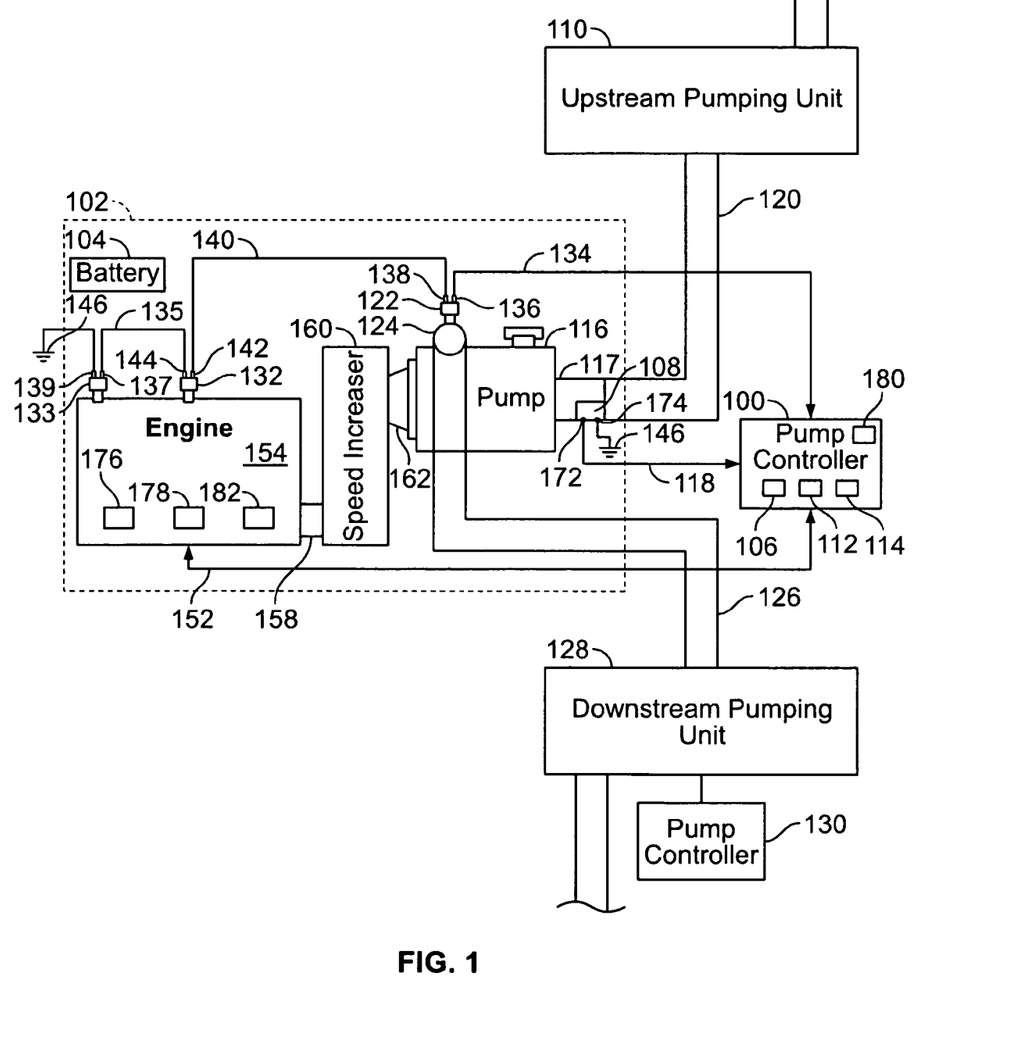
FIG. 1 illustrates pumping units arranged in a tandem configuration in accordance with an embodiment of the present invention.

FIG. 1 illustrates pumping units 102, 110 and 128 arranged in a tandem configuration in accordance with an embodiment of the present invention. Each pump may be driven by a separate engine, or an engine may be used to drive two or more pumps. For clarity, the configuration of the one or more pumps interconnected with an engine is herein referred to as a pumping unit. Pumping unit 102 is downstream, or receives water from, upstream pumping unit 110. Downstream pumping unit 128 is downstream from the pumping unit 102.

A pump controller 100 controls the pumping unit 102 automatically. The pump controller 100 may be external, integrated with, or attached to the pumping unit 102. The pump controller 100 may be used in pumping configurations where the pumping unit 102 is downstream of another pumping unit or in some situations when the pumping unit 102 may be left unattended by an operator.

The pumping unit 102 has a pump 116 with a suction inlet 117 configured to receive water through hose 120 from the upstream pumping unit 110. The pumping unit 102 also has an engine 154 with an engine output drive shaft 158 that drives an optional speed increaser 160. The speed increaser 160 drives the pump 116 with an output shaft (not shown) and is interconnected to the pump 116 via pump hub 162. Alternatively, the pump 116 may be driven directly by the engine output drive shaft 158. The pump 116 has a discharge outlet 124 for discharging water to hose 126. The hose 126 may deliver water to the downstream pumping unit 128 which is controlled by a dedicated pump controller 130 as illustrated, or the water may be used to fight a fire, fill a tank, and the like.

The pumping unit 102 has one or more sensors and/or switches for detecting certain parameters. A water flow sensor 108 senses water flow into the suction inlet 117 of the pump 116. A water pressure switch 122 is installed proximate discharge outlet 124 to sense water pumped out of the pump 116 into hose 126. An oil pressure switch 132 monitors oil pressure within the engine 154. A vibrational sensor 133 is installed proximate the engine 154 to sense vibrations caused by the engine 154 during operation. More than one vibrational sensor 133 may be used.

The pump controller 100 receives and monitors signals from the sensors and switches installed on and/or proximate the pumping unit 102 and initiates action based on the signals. The interconnection of the sensors, switches and pump controller 100 is exemplary, and it should be understood that other interconnections and configurations may be used. A water flow sense line 118 interconnects a first terminal 172 of the water flow sensor 108 with the pump controller 100. A second terminal 174 of the water flow sensor 108 may be connected to a common ground 146. A water pressure sense line 134 interconnects a first terminal 136 of the water pressure switch 122 with the pump controller 100. Oil pressure sense line 140 interconnects a first terminal 142 of the oil pressure switch 132 with a second terminal 138 of the water pressure switch 122. A vibration sense line 135 interconnects a first terminal 137 of the vibrational sensor 133 with a second terminal 144 of the oil pressure switch 132, while second terminal 139 of the vibrational sensor 133 is connected to the common ground 146. The sense lines 118, 134, 135 and 140 are illustrated separately but may be provided within a single cable.

Alternatively, the signals may be monitored separately, wherein the oil pressure sense line 140 and vibration sense line 135 may be directly connected to the pump controller 100, while the second terminals 138 and 144 of the water pressure switch 122 and oil pressure switch 132, respectively, may be connected to the common ground 146. Other types of sensors and/or switches which may not be connected to ground may be used to provide the signals. It should be understood that one or more than one signal may be used, and that one or more other indicators or parameters may be monitored in addition to, or instead of, the signals discussed herein.

The engine 154 is connected to the pump controller 100 via engine control line(s) 152. The engine control line(s) 152 may have multiple wires or lines for sending signals to control multiple operations or to initiate actions as described further below. For example, the pump controller 100 may control the on/off state of the engine 154 by sending signals to a starting component such as a starter motor 176, an ignition switch 178, and choke 182, as well as to components controlling engine speed or RPM (not shown).

The pump controller 100 determines whether the pumping unit 102 is operating, that is, if the engine 154 is running and the pump 116 is outputting water, based on the signal(s) from the water pressure switch 122, the oil pressure switch 132, and/or the vibrational sensor 133. When the water pressure switch 122 detects water pressure at the discharge outlet 124 which is being output at or above a predetermined level, the water pressure switch 122 closes and creates an electrical short between the first and second terminals 136 and 138. When the oil pressure switch 132 detects oil pressure at the engine 154 which is at or above a predetermined level, the oil pressure switch 132 closes and creates an electrical short between the first and second terminals 142 and 144. When the vibrational sensor 133 detects engine vibrations at or above a predetermined level, the vibrational sensor 133 closes and creates an electrical short between the first and second terminals 137 and 139. For example, in the configuration of FIG. 1, when the water pressure switch 122, the oil pressure switch 132, and the vibrational sensor 133 are closed, the pump controller 100 detects a ground signal which indicates that the pumping unit 102 is operating. If one or more of the water or oil pressure switches 122 and 132 or the vibrational sensor 133 are open, however, the pump controller 100 detects an open circuit, which indicates that the pumping unit 102 is not operating.

Alternatively, the pump controller 100 may be configured to detect the status of the water and oil pressure switches 122 and 132 and vibrational sensor 133 separately. Thus, the pump controller 100 may detect one or more of a water pressure switch signal, an oil pressure switch signal and a vibration sensor signal and use logic within the microprocessor 112 to determine the operational status of the pumping unit 102.

Figure 2:
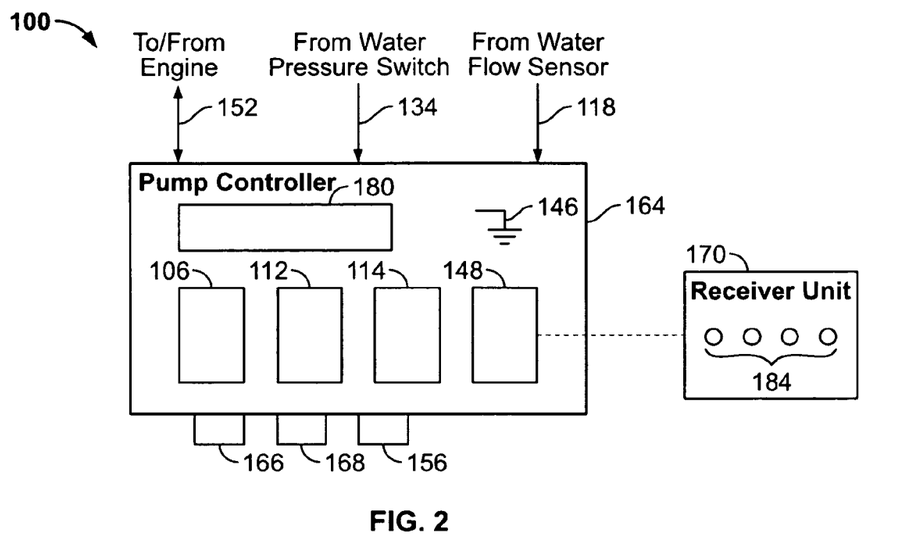
FIG. 2 illustrates the pump controller of FIG. 1 in accordance with an embodiment of the present invention.

FIG. 2 illustrates the pump controller 100 in accordance with an embodiment of the present invention. The pump controller 100 automatically operates the pumping unit 102 (FIG. 1) based on the flow of water received by the pumping unit 102. The pump controller 100 may receive power from a battery 104 (FIG. 1) within the pumping unit 102 or have its own battery 106 or source of power. The pump controller 100 may have a microprocessor 112, memory 114, a series of relays 180, and/or other circuitry, such as solenoids and switches within an outer cover 164 for monitoring and controlling the associated pumping unit 102.

The pump controller 100 may also be equipped with communication capability. A transmitter 148 may communicate over radio frequency (RF), cellular, or short-wave radio waves, communicate to a global positioning system (GPS), or other communication technologies. The transmitter 148 may transmit a code identifying the pump controller 100 and the status of the pumping unit 102. For example, a person operating the series of pumping units in a water line may have a receiver unit 170 with a small display or colored LEDs 184 identifying the status of each pumping unit 102.

A reset button 156 may be provided for allowing an operator to manually reset the pump controller 100. In addition, a strobe 166 and/or horn 168 may be provided to indicate a state of the pumping unit 102. For example, the strobe 166 can be visibly monitored from an airplane or helicopter and may be turned on by the microprocessor 112 when the pumping unit 102 is running.

Figure 3:
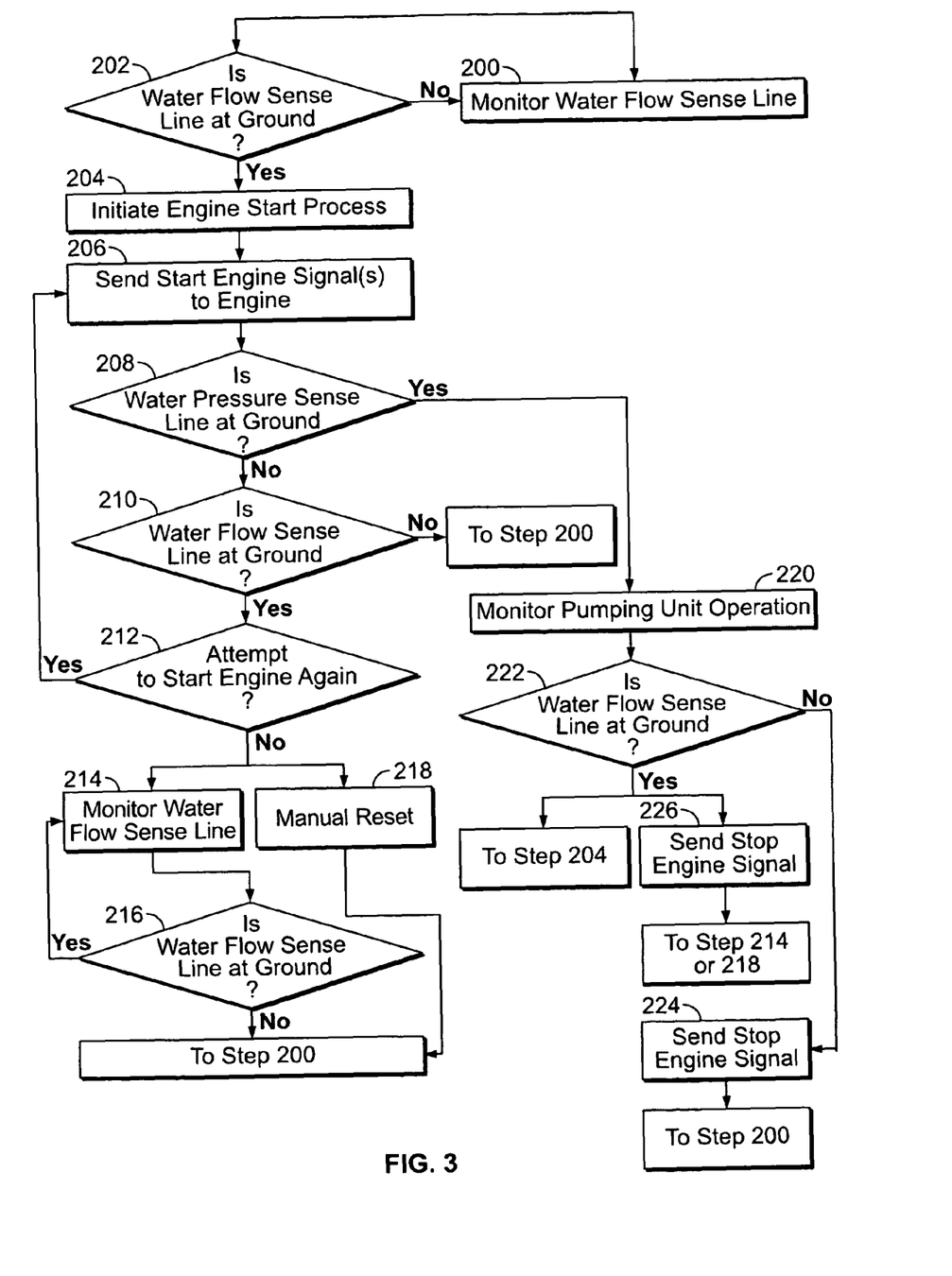
FIG. 3 illustrates a flowchart of the operation of the pump controller of FIG. 1 in accordance with an embodiment of the present invention.

FIG. 3 illustrates a flowchart of the operation of the pump controller 100. FIG. 3 will be discussed together with FIGS. 1 and 2. In step 200, the microprocessor 112 of the pump controller 100 monitors the water flow sense line 118. In step 202, if the microprocessor 112 detects that the water flow sense line 118 is open, sufficient water flow is not available at the suction inlet 117. The microprocessor 112 may ensure that the signal to the ignition switch 178 via engine control line 152 is at ground or other predetermined level, indicating an "off" state for the engine 154 and the method returns to step 200. When the water flow sensor 108 senses a flow of water at or above a predetermined level, indicating that enough water is available to the pump 116 at the suction inlet 117 for operation of the pumping unit 102, the water flow sensor 108 closes, connecting the water flow sense line 118 to the common ground 146. In step 202, if the microprocessor 112 detects a ground level on the water flow sense line 118, the method passes to step 204.

In step 204, the microprocessor 112 initiates an engine start process to start the engine 154 within the pumping unit 102. The pump controller 100 may be programmed to attempt to start the pumping unit 102 multiple times, such as three times, or may try to start the pumping unit 102 for a predetermined amount of time, such as 11 seconds. It should be understood that the engine 154 is equipped for electrical start or other start mechanism which does not require operator intervention.

In step 206, the microprocessor 112 sends start engine signal(s) to the engine 154 over the engine control line 152. By way of example, the microprocessor 112 may send a 12 V signal level to the starter motor 176 (or starter solenoid) and an "on" signal, such as 5 V or 12 V signal level to the ignition switch 178 using relays within the series of relays 180. The starter motor 176 will crank, or attempt to turn over, the engine 154 while receiving the 12 V signal level. The microprocessor 112 may hold the 12 V signal level for a predetermined cranking time, such as four seconds. The microprocessor 112 may also send a signal over the engine control line 152 to engage the choke 182.

In step 208, the microprocessor 112 determines whether the water pressure sense line 134 is at ground, indicating that the water pressure switch 122, the oil pressure switch 132, and the vibrational sensor 133 are closed. As discussed previously, when the pumping unit 102 has been started and is pumping water out the discharge outlet 124 as desired, the water pressure at the discharge outlet 124, the oil pressure in the engine 154, and the level of vibration created by the engine 154 are at or above predetermined levels. Optionally, by monitoring the water pressure, vibration, and oil pressure sense lines 134, 135 and 140 separately, the microprocessor 112 may sense the water pressure switch 122, oil pressure switch 132 and vibrational sensor 133 separately. Also, as other types of switches and sensors may be used, the microprocessor 112 may monitor sense lines for other signal levels, such as, for example, a 5 V or 12 V voltage level.

If the water pressure sense line 134 is open (not at ground), or, if being monitored separately, at least one of the water pressure, vibration, and oil pressure sense lines 134, 135 and 140 are open or otherwise indicating that the pumping unit 102 is not operating, the method passes to step 210, where the microprocessor 112 determines whether the water flow sense line 118 is at ground, indicating that the water flow sensor 108 is still detecting water. If water is not detected, the microprocessor 112 terminates the engine start process of the pumping unit 102 and flow returns to step 200.

If water flow is indicated by the water flow sense line 118, the method passes to step 212 where the microprocessor 112 determines whether an additional attempt should be made to start the engine 154. If another attempt is to be made, flow returns to step 206 where the microprocessor 112 sends the start engine signal(s) to the engine 154 over the engine control line 152.

If, at step 212, the predetermined number of start attempts has been made or the predetermined amount of time has elapsed, the engine start process is stopped. It is desirable to prevent the microprocessor 112 from continuing to try to start the pumping unit 102 which may be experiencing a mechanical failure, such as a failure of one of the switches or sensors, failure within the engine 154, or a lack of fuel, for example. Therefore, the microprocessor 112 may be inhibited from continuing to attempt to start the engine 154 until a reset condition is met, such as the flow of water provided at the suction inlet 117 is stopped and then restarted (step 214), or the reset button 156 or a power switch (not shown) is pressed (step 218).

In one embodiment, the method passes to step 214 where the microprocessor 112 monitors the water flow sense line 118. In step 216, if the water flow sense line 118 is at ground, the water flow has not been removed, and the method returns to step 214. If the water flow sense line 118 is open, then the water flow has been removed and the method returns to step 200. In another embodiment, the method passes to from step 212 to step 218 where the microprocessor 112 may enter a failure mode which may be resolved by cycling the power to the pump controller 100 or by pressing the reset button 156. After being manually reset, the method returns to step 200.

Returning to step 208, if the microprocessor 112 determines that the water and oil pressures and the level of vibration are at the desired levels (the water pressure switch 122, the oil pressure switch 132 and the vibrational sensor 133 are closed and thus the water pressure sense line 134 is at ground), flow passes to step 220. At this point, the pumping unit 102 is on and is pumping water out of the discharge outlet 124. In step 220, the microprocessor 112 monitors the water pressure sense line 134. Optionally, the microprocessor 112 may monitor one or more of the water pressure sense line 134, the oil pressure sense line 140, and the vibration sense line 135 separately. The microprocessor 112 may turn on the strobe 166 and/or horn 168, indicating that the pumping unit 102 is operating. The microprocessor 112 may also initiate communication over the transmitter 148, reporting that the pumping unit 102 is operating. The microprocessor 112 may also monitor and/or adjust other functions of the pumping unit 102 and the engine 154, such as the engine speed.

While the water pressure sense line 134 is still at ground, the method remains at step 220. If the water pressure sense line 134 is open, indicating no water flow at the discharge outlet 124, a lack of oil pressure, and/or a lack of engine vibration, flow passes to step 222.

In step 222, the microprocessor 112 determines whether the water flow sense line 118 is at ground, indicating that water is still being supplied at the suction inlet 117. If water is not being supplied, the method passes to step 224 where the microprocessor 112 sends a stop engine signal to the engine 154 via the engine control line 152. By way of example, the line to the ignition switch 178 may be pulled to ground using a relay within the series of relays 180. The microprocessor 112 also turns off the strobe 166 and/or horn 168, and may command the transmitter 148 to send a signal to the receiver unit 170 notifying the operator that the pumping unit 102 is off. The method then returns to step 200.

If, in step 222, the water flow sense line 118 indicates that water is still being supplied at the suction inlet 117, the microprocessor 112 may determine that the pumping unit 102 has shut off. In one embodiment, flow may return to step 204 to begin the engine start sequence. Alternatively, the microprocessor 112 may determine that the pumping unit 102 has experienced a failure, wherein the method flows to step 226. In step 226, the microprocessor 112 sends the stop engine signal to the engine 154 to ensure that the pumping unit 102 is off. The microprocessor 112 also turns off the strobe 166 and/or horn 168, and may command the transmitter 148 to send a signal to the receiver unit 170 notifying the operator that a failure has occurred and/or that the pumping unit 102 is off. The pump controller 100 may then be reset by returning to step 214 (reset by removal of water flow) or to step 218 (manual reset).

Figure 4:
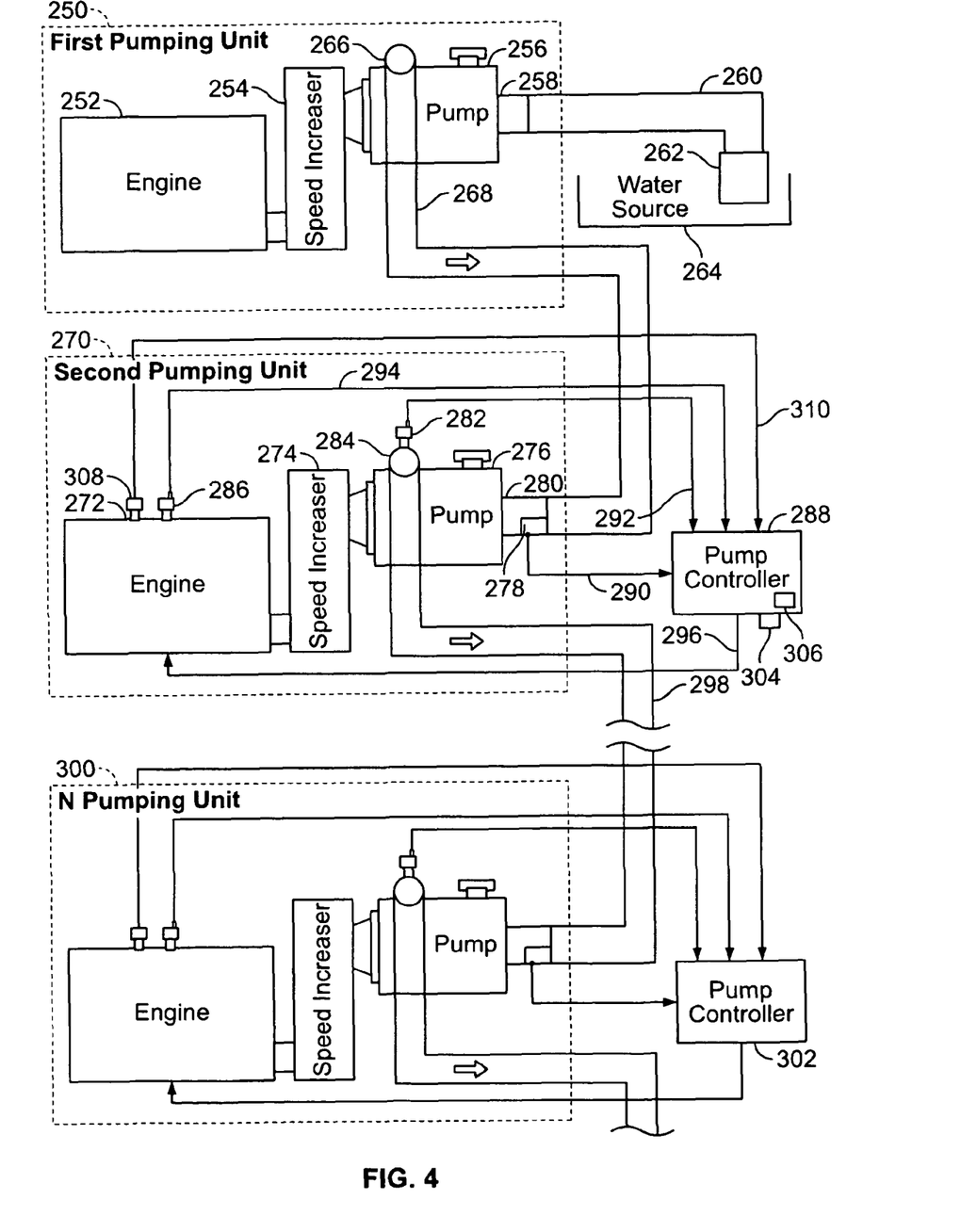
FIG. 4 illustrates multiple pumping units connected in tandem to form a water line that may be automatically controlled by using pump controllers in accordance with an embodiment of the present invention.

FIG. 4 illustrates N pumping units connected in tandem to form a water line that may be automatically controlled using pump controllers. A second pumping unit 270 is controlled by pump controller 288 and receives water from a first pumping unit 250. Any number of pumping units may be connected in tandem downstream of the first pumping unit 250. N pumping unit 300 is controlled by pump controller 302 and receives water from an upstream pumping unit. The pump controllers 288 and 302 control their respective pumping units based on the water flow received at the pumping unit.

The first pumping unit 250 is provided with an engine 252, optional speed increaser 254 and pump 256 interconnected with one another as previously discussed in FIG. 1. Suction inlet 258 receives water through hose 260 which may be connected to a foot-valve 262. Water source 264 may be a river, lake, tanker truck, and the like. An operator is present at the first pumping unit 250. Therefore, the engine 252 may be started manually, remotely, or another known method of starting may be used. The pump 256 outputs water through discharge outlet 266 to hose 268. The length of the hose 268 carrying the water to the second pumping unit 270 over terrain and elevation may vary.

The second pumping unit 270 has an engine 272, optional speed increaser 274 and pump 276 interconnected as previously discussed. A water flow sensor 278 is installed in suction inlet 280. A water pressure switch 282 is installed proximate discharge outlet 284, an oil pressure switch 286 is installed to monitor the oil pressure in the engine 272, and a vibrational sensor 308 is installed to monitor vibrations created when the engine 272 is running. A pump controller 288 may monitor the water flow sensor 278 via water flow sense line 290, water pressure switch 282 via water pressure sense line 292, oil pressure switch 286 via oil pressure sense line 294, and vibrational sensor 308 via vibration sense line 310. Therefore, each sensor and/or switch is monitored separately. The pump controller 288 controls the second pumping unit 270 by sending control signals via engine control line 296.

No operator is needed at the second pumping unit 270. The pump controller 288 monitors the water flow sense line 290 (step 200 of FIG. 4). When the pump controller 288 detects that sufficient water is present for operation of the second pumping unit 270 via the water flow sense line 290 (step 202), the pump controller 288 initiates the engine start process (step 204). The pump controller 288 continues to operate and control the second pumping unit 270 as discussed previously.

The second pumping unit 270 pumps water out the discharge outlet 284 to hose 298. As stated previously, there is no limit to the number of pumping units with dedicated pump controllers which may be installed in tandem. In FIG. 4, the last pumping unit in the water line is N pumping unit 300, which has the same configuration as the second pumping unit 270. Each pumping unit installed between the second pumping unit 270 and N pumping unit 300 may have an associated pump controller so that no operator is needed to monitor and operate the pumping units.

Therefore, the operator located at the first pumping unit 250 does not need to rush to turn downstream pumping units on when water delivery is started, or to turn downstream pumping units off if water is not being supplied or a pumping unit in the water line shuts off. This prevents the wasting of water and fuel, as well as unnecessary wear on the pumping units. Also, the strobe 304 on pump controller 288 (as well as strobes on other pump controllers) may be monitored from the air. Additionally, transmitter 306 may transmit a status of the pump controller 288 to the receiver unit 170 (FIG. 2) as discussed previously. This may be helpful when many pumping units are installed within a water line and the downstream end reports no water received. The operator can easily determine which pumping unit is not operating, saving time and energy resolving the problem.

Figure 5:
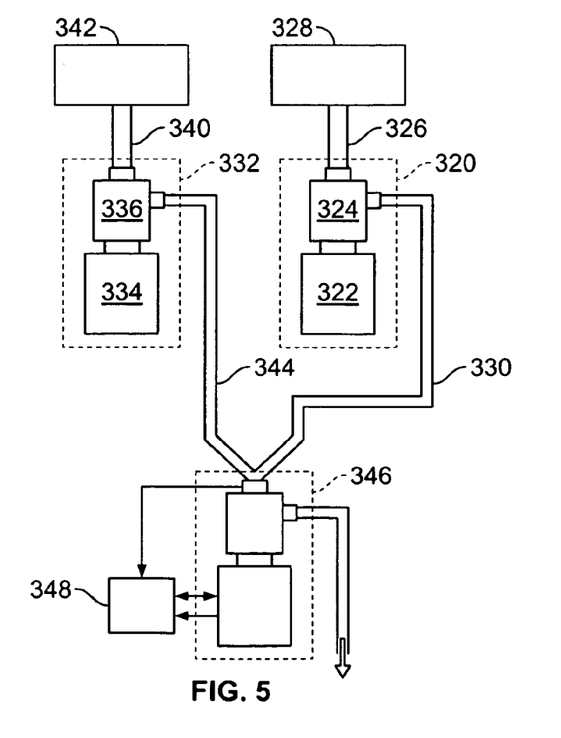
FIG. 5 illustrates two pumping units feeding a downstream pumping unit to form a water line that may be automatically controlled by using pump controllers in accordance with an embodiment of the present invention.

FIG. 5 illustrates two pumping units feeding a downstream pumping unit to form a water line that may be automatically controlled by using pump controllers. The configuration illustrated in FIG. 5 may be used, for example, when very high water pressure is desired at the downstream end or when difficult terrain is encountered.

First pumping unit 320 has an engine 322 and pump 324. The first pumping unit 320 accepts water from hose 326, supplied from water source 328, and outputs water to hose 330. Second pumping unit 332 has an engine 334 and pump 336. The second pumping unit 332 accepts water from hose 340, supplied from water source 342, and outputs water to hose 344. By way of example only, the water sources 328 and 342 may be a water truck, stream, river, lake, and the like. The water sources 328 and 342 may be the same source or different sources.

Hoses 330 and 344 deliver water to third pumping unit 346 which has a pump controller 348. Therefore, no operator is needed to start, stop, or monitor the third pumping unit 346. As discussed previously, an unlimited number of additional pumping units may be installed in tandem downstream of the third pumping unit 346, or between the third pumping unit 346 and one or more of the first and second pumping units 320 and 332.

While the invention has been described in terms of various specific embodiments, those skilled in the art will recognize that the invention can be practiced with modification within the spirit and scope of the claims.

What is claimed is:

1. A system for automatically controlling a pumping unit used in fire suppression, comprising:
   a pumping unit comprising a pump having a suction inlet configured to receive water from an upstream pumping unit and an engine to run the pump;
   a water flow sensor for sensing water flow into the suction inlet of the pumping unit; and
   a pump controller for receiving a water flow sensor signal from the water flow sensor, the pump controller controlling an on/off state of the engine based on the water flow sensor signal, the pump controller attempting to start the engine for any of a predetermined number of times and a predetermined amount of time, the pump controller inhibiting further attempts to start the engine until a reset condition is satisfied.

2. The system of claim 1, the pumping unit further comprising:

a discharge outlet for discharging water out of the pump; and a water pressure switch for sensing water flow out of the discharge outlet, the pump controller receiving a water pressure switch signal from the water pressure switch and further controlling the on/off state of the engine based on the water pressure switch signal.

3. The system of claim 1, the pumping unit further comprising an oil pressure switch for detecting a level of oil pressure within the engine, the pump controller receiving an oil pressure switch signal from the oil pressure switch and further controlling the on/off state of the engine based on the oil pressure switch signal.

4. The system of claim 1, the pumping unit further comprising a vibrational sensor for detecting a level of vibration created by the engine, the pump controller receiving a vibration sense signal from the vibrational sensor and further controlling the on/off state of the engine based on the vibration sense signal.

5. The system of claim 1, the engine further comprising an ignition switch for setting the on/off state and a starting component for starting the engine, the pump controller sending a start engine signal to the engine when the water flow sensor signal indicates water flow into the suction inlet, the start engine signal comprising at least one of an ignition on signal and a starting component activation signal.

6. The system of claim 1, further comprising:
the pumping unit further comprising:
a discharge outlet for discharging water out of the pump; and
at least one of a water pressure switch, an oil pressure switch and a vibrational sensor, wherein the water pressure switch senses water flow out of the discharge outlet, wherein the oil pressure switch detects a level of oil pressure within the engine, and wherein the vibrational sensor detects vibrations created by the engine; and
the pump controller receiving at least one signal from at least one of the water pressure switch, oil pressure switch, and vibrational sensor, the pump controller further controlling the on/off state of the engine based on the at least one signal.

7. The system of claim 1, the pump controller further comprising a microprocessor, the microprocessor inhibiting the engine from starting when the water flow sensor signal indicates water flow below a predetermined level at the suction inlet.

8. The system of claim 1, the pump controller further comprising a transmitter for communicating at least one of the on/off state, failure information, and status information with respect to the pumping unit to a receiver unit.

9. The system of claim 1, further comprising a receiver unit configured to receive wireless communication from the pumping unit and the upstream pumping unit, the receiver unit further configured to indicate a status associated with the pumping unit and a status associated with the upstream pumping unit.

10. The system of claim 1, wherein the reset condition may be any of a manual reset and the water flow sensor sensing removal and restarting of the water flow into the suction inlet of the pumping unit.

11. A system for controlling a pumping unit used in fire suppression, comprising:
means for supplying water to a suction inlet of a pumping unit;
a water flow sensor for detecting the water in the suction inlet of the pumping unit; and a microprocessor for controlling the operation of the pumping unit based on at least a signal from the water flow sensor indicating whether water is available at the suction inlet, the microprocessor outputting a start signal to start the pumping unit when the water flow sensor indicates water is available, the microprocessor inhibiting the pumping unit from running when the water flow sensor indicates water is not available, the microprocessor further determining that the pumping unit is not running after outputting the start signal and inhibiting the outputting of the start signal until after the water flow sensor indicates that water flow is not available to the pumping unit.

12. The system of claim 11, further comprising at least one of a water pressure switch, an oil pressure switch and a vibrational sensor, wherein the water pressure switch indicates whether water is being output by the pumping unit, wherein the oil pressure switch indicates a level of oil pressure within an engine for running the pumping unit, and wherein the vibrational sensor indicates a level of vibration created by the engine which indicates whether the engine is operating, the microprocessor determining whether the pumping unit is running based on signals from the water pressure switch, the oil pressure switch and the vibrational sensor.

13. The system of claim 11, further comprising means for determining whether the pumping unit is running and outputting water, the microprocessor turning the pumping unit off when no water is being output.

14. The system of claim 11, the start signal to start the pumping unit further comprising a voltage level being output by the microprocessor for a predetermined period of time, the voltage level being received by a starting component within the pumping unit.

15. The system of claim 11, further comprising means for electrically starting the pumping unit.

16. A method for automatically controlling a pumping unit used in fire suppression, comprising:
connecting a discharge outlet of an upstream pumping unit with a suction inlet of a pumping unit;
monitoring a water flow sensor signal to determine if water is available at the suction inlet of the pumping unit;
outputting a start signal to start an engine which runs the pumping unit when the water flow sensor indicates that water is available at the suction inlet, the start signal being output for any of a predetermined number of times and a predetermined time period;
determining if the pumping unit is running; and
waiting for the water flow sensor signal to indicate that water is not available before repeating the outputting step.

17. The method of claim 16, further comprising:
monitoring at least one of a water pressure switch signal, an oil pressure switch signal and a vibration sense signal, wherein the water pressure switch signal indicates whether water is being output from the pumping unit, wherein the oil pressure switch signal indicates a level of oil pressure within the engine with respect to a predetermined level, and wherein the vibration sense signal indicates a level of vibration detected proximate the engine with respect to a predetermined vibration level; and
determining whether the pumping unit is running based on at least one of the water pressure switch signal, the oil pressure switch signal, and the vibration sense signal.

18. The method of claim 16, further comprising outputting a signal to indicate that the pumping unit is running, the signal activating at least one of a strobe and a horn.

19. The method of claim 16, wherein when the pumping unit is running, the method further comprising:
monitoring signals within the pumping unit; and
turning the pumping unit off when the signals indicate at least one of a level of water output from the pumping unit which is less than a predetermined water output level, a level of oil pressure within the engine running the pumping unit which is less than a predetermined oil pressure, and a level of sensed vibration proximate the engine which is less than a predetermined level of vibration.

20. The method of claim 16, further comprising:
receiving wireless transmissions with a receiver unit, the receiver unit being located remote from the pumping unit and the upstream pumping unit; and
indicating at least one of an on/off state, failure information, and status information associated with at least one of the pumping unit and the upstream pumping unit based on the transmissions.

* * * * *